(12) United States Patent
Yamamura (10) Patent No.: US 10,571,905 B2
(45) Date of Patent: Feb. 25, 2020

(54) CONTROL APPARATUS FOR UTILITY VEHICLE

(71) Applicant: Honda Motor Co., Ltd., Tokyo (JP)

(72) Inventor: Makoto Yamamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 319 days.

(21) Appl. No.: 15/473,457

(22) Filed: Mar. 29, 2017

(65) Prior Publication Data

US 2017/0285630 A1    Oct. 5, 2017

(30) Foreign Application Priority Data

Mar. 31, 2016 (JP) .................. 2016-071939

(51) Int. Cl.
| | | |
|---|---|---|
| *G05D 1/00* | (2006.01) | |
| *G05D 1/02* | (2006.01) | |
| *B60L 53/36* | (2019.01) | |
| *A01D 34/00* | (2006.01) | |

(52) U.S. Cl.
CPC ......... *G05D 1/0016* (2013.01); *A01D 34/008* (2013.01); *B60L 53/36* (2019.02); *G05D 1/0265* (2013.01); *G05D 1/0274* (2013.01); *B60L 2200/40* (2013.01); *B60L 2250/16* (2013.01); *G05D 2201/0208* (2013.01)

(58) Field of Classification Search
None
See application file for complete search history.

(56) References Cited

U.S. PATENT DOCUMENTS

| | | | | |
|---|---|---|---|---|
| 5,995,884 | A | 11/1999 | Allen et al. | |
| 8,532,864 | B2 * | 9/2013 | Sato | G05D 1/0259 |
| | | | | 700/254 |
| 9,332,691 | B2 * | 5/2016 | Fukuda | A01D 34/008 |
| 2014/0324246 | A1 * | 10/2014 | Biber | G05D 1/0219 |
| | | | | 700/302 |
| 2016/0109241 | A1 * | 4/2016 | Eguchi | G05D 1/0265 |
| | | | | 701/23 |
| 2016/0165795 | A1 * | 6/2016 | Balutis | G05D 1/0265 |
| | | | | 701/25 |
| 2018/0332765 | A1 * | 11/2018 | Doughty | A01D 34/008 |

FOREIGN PATENT DOCUMENTS

| | | |
|---|---|---|
| EP | 2390741 A2 | 11/2011 |
| EP | 2926642 A1 | 10/2015 |

\* cited by examiner

*Primary Examiner* — Abdhesh K Jha
(74) *Attorney, Agent, or Firm* — Duft & Bornsen, PC (57) ABSTRACT

In an apparatus for controlling operation of a utility vehicle that is driven to run within a working area, a map is generated by arraying multiple cells in a grid pattern with respect to the working area, area of the working area is calculated based on the generated map, and required work period per unit time period is calculated in accordance with first characteristics with respect to the calculated area. Then user information including the calculated area and required work period are shown to prompt the user to input user's preferred work period and preferred working time of day. Next target work schedule is calculated by distributing the required work period within the unit time period in accordance with second characteristics based on the user's preferred work period and working time of day inputted by the user and work is controlled in accordance with the calculated schedule.

14 Claims, 11 Drawing Sheets

| ACREAGE | | REQUIRED WORK PERIOD PER WEEK (h) |
|---|---|---|
| WORKING AREA ($m^2$) | 100 | 7 |
| | 200 | 14 |
| | 300 | 20 |
| | 400 | 25 |
| | 500 | 30 |
| | 600 | 35 |
| | 700 | 40 |
| | 800 | 45 |
| | 900 | 49 |
| | 1000 | 53 |
| | 1100 | 57 |
| | 1200 | 60 |
| | 1300 | 64 |
| | 1400 | 67 |
| | 1500 | 70 |
| | 1600 | 73 |
| | 1700 | 76 |
| | 1800 | 79 |
| | 1900 | 82 |
| | 2000 | 84 |
| | 2100 | 87 |
| | 2200 | 89 |
| | 2300 | 91 |
| | 2400 | 93 |
| | 2500 | 95 |
| | 2600 | 97 |
| | 2700 | 99 |
| | 2800 | 101 |
| | 2900 | 103 |
| | 3000 | 105 |
| | 3100 | 107 |
| | 3200 | 108 |
| | 3300 | 110 |
| | 3400 | 111 |
| | 3500 | 113 |
| | 3600 | 114 |
| | 3700 | 116 |
| | 3800 | 117 |
| | 3900 | 118 |
| | 4000 | 120 |

FIG. 12

IN CASE OF WORK IN 2000 (m$^2$) BY 84 HOUR/WEEK

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|---|
| MON | 162 | 136 | 135 | 134 | 100 | 99 | 45 | 44 | 43 | 1 | 2 | 3 | 61 | 62 | 10 | 11 | 12 | 52 | 53 | 54 | 113 | 114 | 115 | 155 | |
| TUE | 165 | 145 | 144 | 143 | 106 | 105 | 69 | 68 | 67 | 19 | 20 | 21 | 79 | 80 | 25 | 26 | 27 | 73 | 74 | 75 | 122 | 123 | 124 | 158 | |
| WED | 163 | 139 | 138 | 137 | 102 | 101 | 48 | 47 | 46 | 4 | 5 | 6 | 63 | 64 | 13 | 14 | 15 | 55 | 56 | 57 | 116 | 117 | 118 | 156 | |
| THU | 166 | 148 | 147 | 146 | 108 | 107 | 72 | 71 | 70 | 22 | 23 | 24 | 81 | 82 | 28 | 29 | 30 | 76 | 77 | 78 | 125 | 126 | 127 | 159 | |
| FRI | 164 | 142 | 141 | 140 | 104 | 103 | 51 | 50 | 49 | 7 | 8 | 9 | 65 | 66 | 16 | 17 | 18 | 58 | 59 | 60 | 119 | 120 | 121 | 157 | |
| SAT | 168 | 154 | 153 | 152 | 112 | 111 | 93 | 92 | 91 | 37 | 38 | 39 | 97 | 98 | 40 | 41 | 42 | 94 | 95 | 96 | 131 | 132 | 133 | 161 | |
| SUN | 167 | 151 | 150 | 149 | 110 | 109 | 85 | 84 | 83 | 31 | 32 | 33 | 89 | 90 | 34 | 35 | 36 | 86 | 87 | 88 | 128 | 129 | 130 | 160 | |

FIG. 13

IN CASE OF WORK IN 2000 (m²) BY 84 HOUR/WEEK

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|---|
| MON | 162 | 136 | 135 | 134 | 100 | 99 | 45 | 44 | 43 | 1 | 2 | 3 | 61 | 62 | 10 | 11 | 12 | 52 | 53 | 54 | 113 | 114 | 115 | 155 | |
| TUE | 165 | 145 | 144 | 143 | 106 | 105 | 69 | 68 | 67 | 19 | 20 | 21 | 79 | 80 | 25 | 26 | 27 | 73 | 74 | 75 | 122 | 123 | 124 | 158 | |
| WED | 163 | 139 | 138 | 137 | 102 | 101 | 48 | 47 | 46 | 4 | 5 | 6 | 63 | 64 | 13 | 14 | 15 | 55 | 56 | 57 | 116 | 117 | 118 | 156 | |
| THU | 166 | 148 | 147 | 146 | 108 | 107 | 72 | 71 | 70 | 22 | 23 | 24 | 81 | 82 | 28 | 29 | 30 | 76 | 77 | 78 | 125 | 126 | 127 | 159 | |
| FRI | 164 | 142 | 141 | 140 | 104 | 103 | 51 | 50 | 49 | 7 | 8 | 9 | 65 | 66 | 16 | 17 | 18 | 58 | 59 | 60 | 119 | 120 | 121 | 157 | |
| SAT | 168 | 154 | 153 | 152 | 112 | 111 | 93 | 92 | 91 | 37 | 38 | 39 | 97 | 98 | 40 | 41 | 42 | 94 | 95 | 96 | 131 | 132 | 133 | 161 | |
| SUN | 167 | 151 | 150 | 149 | 110 | 109 | 85 | 84 | 83 | 31 | 32 | 33 | 89 | 90 | 34 | 35 | 36 | 86 | 87 | 88 | 128 | 129 | 130 | 160 | |

FIG. 14

CONTROL APPARATUS FOR UTILITY VEHICLE

CROSS-REFERENCE TO RELATED APPLICATIONS

This application is based upon and claims the benefit of priority from Japanese Patent Application No. 2016-071939 filed on Mar. 31, 2016, the contents of which are incorporated herein by reference.

BACKGROUND OF THE INVENTION

Field of the Invention

This invention relates to a control apparatus for a utility vehicle, particularly to a control apparatus for a utility vehicle that is driven by a prime mover to perform work with a utility unit while running within a working area.

Description of Related Art

A prior art control apparatus for a utility vehicle of this type can be found, for example, in European Patent Application Publication No. EP2390741. The prior art disclosed in the reference is configured to incorporate multiple utility units capable of working in multiple working areas and calculate work shares of the utility units in the multiple working areas.

The technical concept set out in the reference relates to control in the case of deploying multiple utility units to work in multiple working areas, but the usual practice when performing work with a utility vehicle equipped with a single utility unit such as a lawnmower has been to input a work time period into the utility vehicle based on a value empirically determined by the user (operator) or dealer. As a result, it has sometimes become impossible to perform work properly owing to work period being set too long or too short.

SUMMARY OF THE INVENTION

Therefore, the object of this invention is to provide a control apparatus for a utility vehicle that makes it easy for a user to set the work period and enables work to be properly performed.

In order to achieve the object, this invention provides an apparatus and method for controlling operation of a utility vehicle that is driven by a prime mover to run within a working area, a map is generated by arraying multiple cells in a grid pattern with respect to the working area, area of the working area is calculated based on the generated map, and required work period per unit time period is calculated in accordance with first characteristics with respect to the calculated area. User information including at least the calculated area and required work period are shown to prompt the user to input user's preferred work period and preferred working time of day, and target work schedule is calculated by distributing the required work period within the unit time period in accordance with second characteristics based on the user's preferred work period and preferred working time of day inputted by the user and work is controlled in accordance with the calculated target work schedule

BRIEF DESCRIPTION OF THE DRAWINGS

The above and other objects and advantages will be more apparent from the following description and drawings, in which.

DETAILED DESCRIPTION OF THE INVENTION

A control apparatus for a utility vehicle according to an embodiment of this invention is explained with reference to the attached drawings in the following.

Figure 1:
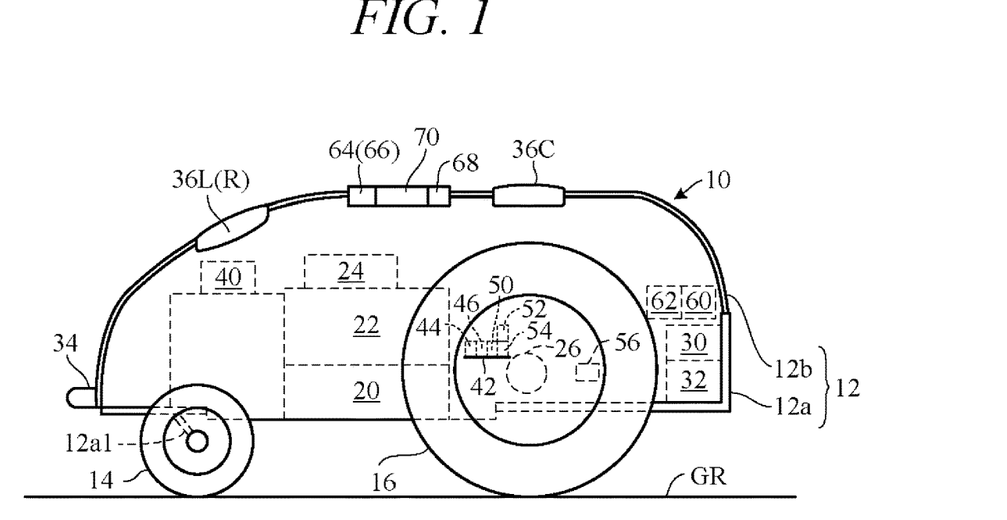
FIG. 1 is an overall schematic diagram showing a control apparatus for a utility vehicle according to an embodiment of this invention.
Figure 2:
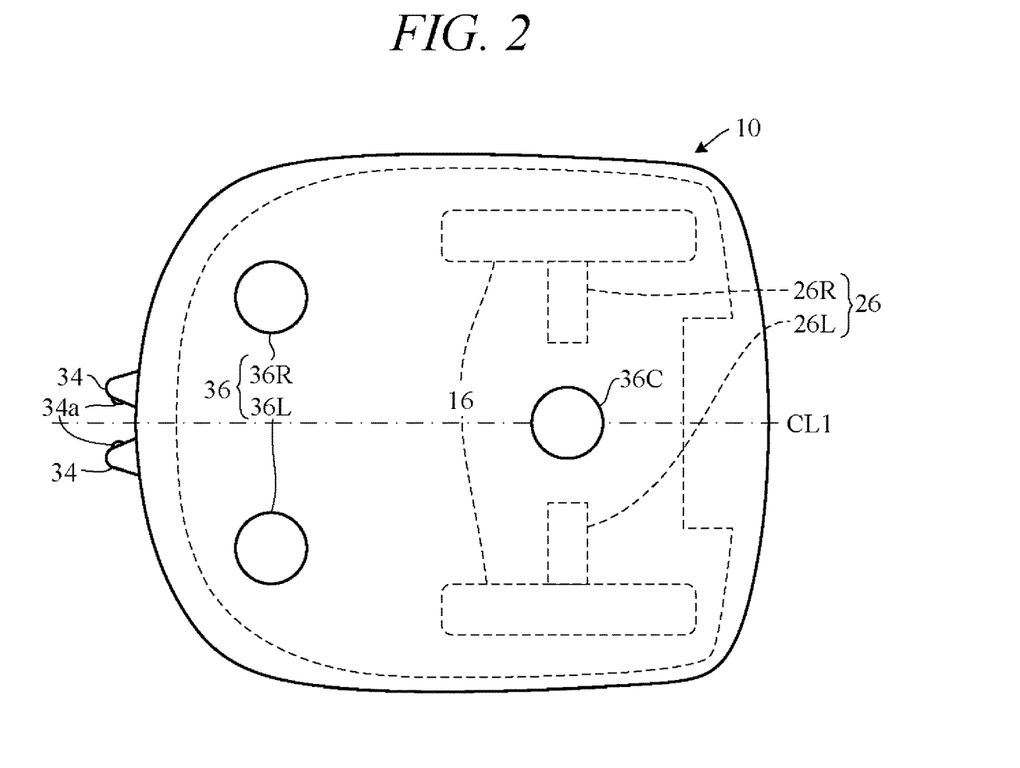
FIG. 2 is a plan view of the utility vehicle illustrated in FIG. 1.
Figure 3:
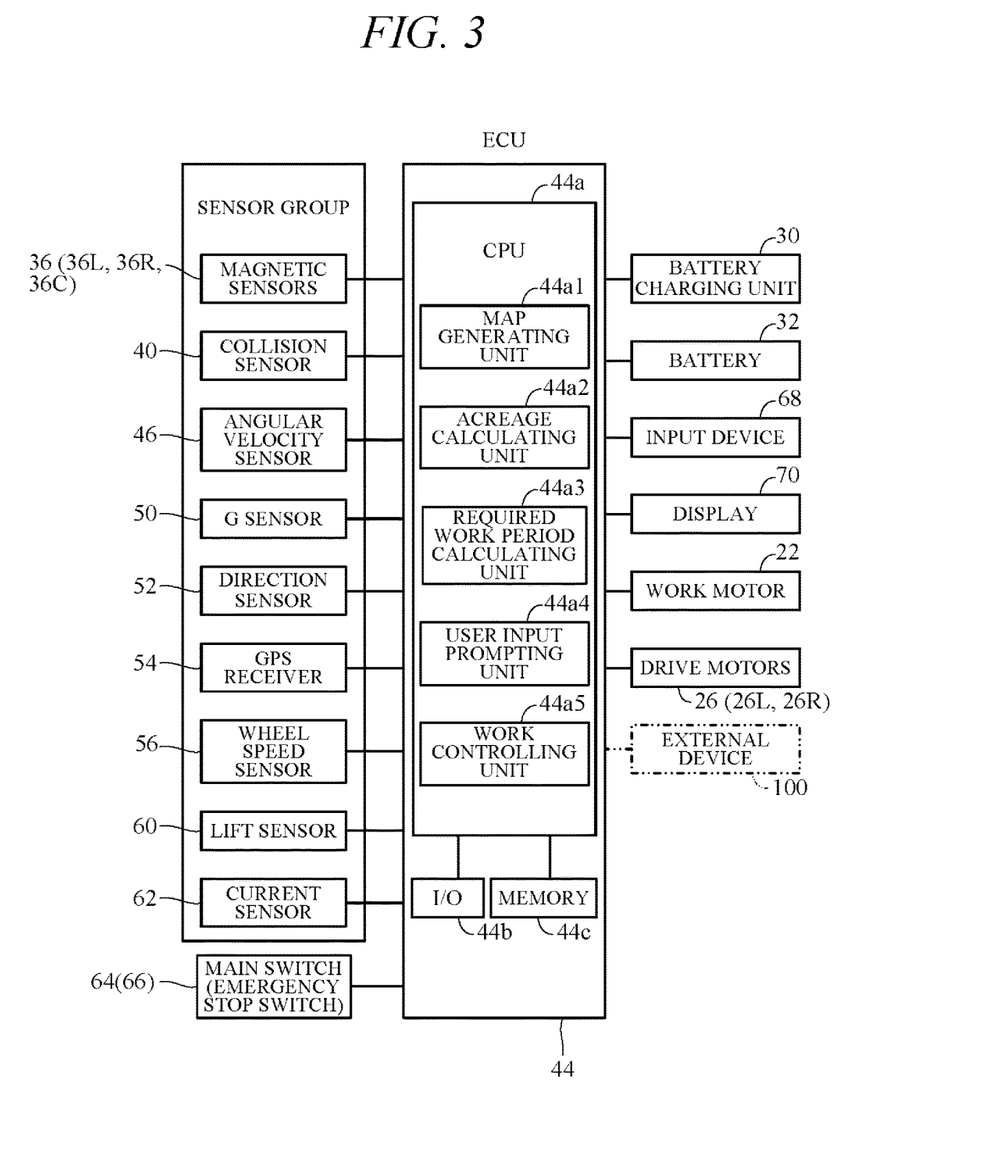
FIG. 3 is a block diagram showing inputs to an Electronic Control Unit installed in the utility vehicle illustrated in FIG. 1.

FIG. 1 is an overall schematic diagram showing a control apparatus for a utility vehicle according to an embodiment of this invention, FIG. 2 is a plan view schematically illustrating the configuration of the utility vehicle illustrated in FIG. 1; and FIG. 3 is a block diagram showing the configuration of the control apparatus of the utility vehicle according to the present embodiment including an Electronic Control Unit.

As shown in FIG. 1, reference symbol 10 designates a utility vehicle, more precisely an autonomously navigating utility vehicle, e.g., a mower; hereinafter called "vehicle".

The utility vehicle of the present invention can be embodied in the form of various types of utility vehicle and particularly as an autonomously navigating utility vehicle as a lawn mower for lawn or grass mowing work. In the following, the forward direction (longitudinal direction) of the utility vehicle in plan view and the vehicle width direction perpendicular to the forward direction are defined as the forward-rearward direction and the leftward-rightward direction, respectively, and the height direction of the utility vehicle is defined as the upward-downward direction. The configuration of the constituents is explained in line with these definitions.

A body 12 of the vehicle 10 comprises a chassis 12a and a frame 12b attached thereto. The vehicle 10 is equipped with relatively small diameter left and right front wheels 14 rotatably fastened to a front end of the chassis 12a through stays 12a1 and relatively large diameter left and right rear wheels 16 rotatably fastened to the chassis 12a directly.

A work unit, e.g., a mower blade (rotary blade) 20, is attached near the middle of the chassis 12a of the vehicle 10, and an electric motor (hereinafter called "work motor") 22 is installed above it. The blade 20 is connected to the electric motor 22 to be driven to rotate by the electric motor 22.

A blade height regulation mechanism 24 manually operable by a user (operator) is connected to the blade 20. The blade height regulation mechanism 24 is equipped with a screw (not shown) and configured to enable the user to regulate the height of the blade 20 above ground level GR by manually rotating the screw.

Two electric motors (hereinafter called "drive motors") 26 are attached to the chassis 12a of the vehicle 10 at a rear end of the blade 20. The drive motors 26 are connected to the left and right rear wheels 16 and rotate normally (drive the vehicle 10 to run forward) or reversely (drive the vehicle 10 to run backward) independently on the left and right, with the front wheels 14 as non-driven (free) wheels and the rear wheels 16 as driven wheels. The blade 20, work motor 22, drive motors 26 and so on are covered by the frame 12b.

The weight and size of the vehicle 1 are such that it can be transported or carried by the user. As an example can be cited a vehicle 1 whose total length (forward-rearward direction length) is about 710 mm, total width about 550 mm, and height about 300 mm.

A battery charging unit 30 and an onboard battery 32 are housed at the rear of the vehicle 10, and a pair of charging terminals 34 are attached to the frame 12b so as to project forward. The battery 32 comprises lithium-ion battery, for example.

The charging terminals 34 are connected to the charging unit 30 through cables, and the charging unit 30 is connected to the battery 32 by cables. The work motor 22 and the drive motors 26 are connected to the battery 32 through connecting cables and are supplied with current from the battery 32. The cables are not shown in FIG. 1.

The vehicle 10 is thus configured as a 4-wheel, electrically-powered, autonomously navigating utility vehicle.

Left and right magnetic sensors 36 are installed at the front of the body 12 of the vehicle 10 at positions laterally symmetrical with respect to a center line extending in the straight forward direction of the vehicle 10. More specifically, as shown in FIG. 2, the first and second magnetic sensors 36R and 36L are installed laterally symmetrically with respect to a center line CL running in the straight forward direction along the widthwise center of the vehicle 10. In addition, a third magnetic sensor 36C is installed on the center line CL1 at a location remote from the sensors 36L and 36R. The magnetic sensors 36 produce an output indicating the magnitude of magnetic field (magnetic field strength or intensity).

A collision (contact) sensor 40 is attached to the frame 12b. The collision sensor 40 outputs an ON signal when the frame 12b detaches from the chassis 12a owing to collision (contact) with an obstacle or foreign object.

A housing box (not shown) installed near the middle of the vehicle 10 houses a printed circuit board 42 carrying an ECU (Electronic Control Unit) 44, which comprises a microcomputer having CPU (microprocessor) 44a, I/O 44b, and memory (ROM, RAM, EEPROM, etc.) 44c and the like.

In the vicinity of the ECU 44 are installed an angular velocity sensor (yaw-rate sensor; yaw sensor) 46 that generates an output indicating angular velocity (yaw-rate) around a center-of-gravity z-axis (vertical axis) of the vehicle 10 (whose time-integrated value indicates a turn angle around the vertical axis), a G sensor (acceleration sensor) 50 that generates an output indicating acceleration G acting on the vehicle 10 in x, y and z (3-axis) directions, a direction sensor 52 that generates an output indicating direction (azimuth) of the vehicle 10 according to terrestrial magnetism, and a GPS (Global Positioning System) receiver 54 that receives satellite-transmitted GPS signals indicating position of the vehicle 10 (the GPS receiver 54 functions as a position sensor that detects position of the vehicle 10).

Wheel speed sensors 56 installed near the rear wheels 16 produce outputs indicating the wheel speeds of the rear wheels 16, and a lift sensor 60 installed between the chassis 12a and the frame 12b outputs an ON signal when the frame 12b is lifted off the chassis 12a by the user or other worker. The vehicle 10 is equipped with a main switch 56 and an emergency stop switch 60 both operable by the user. A current sensor 62 is installed at input/output circuit of the battery 32 and produces an output indicating consumed current of the battery 32.

A main switch 64 for inputting various commands of the user, inter alia, start of operation, and an emergency stop switch 66 for inputting command for stopping the vehicle 10 in case of emergency are installed on the vehicle to be manipulatable by the user. The top of the frame 12b of the vehicle 10 has a large cutaway in which an input device 68 for inputting commands of the user and a display 70 is fitted. The input device 68 and display 70 are connected to the ECU 44. The display 70 displays working modes and the like in accordance with commands sent from the ECU 44.

As shown in FIG. 3, the outputs of the magnetic sensors 36, collision sensor 40, angular velocity sensor 46, etc., are sent to the ECU 44 through the I/O 44b. Based on the inputted data, the ECU 44 controls operation of the vehicle 10 by supplying current to the drive motor 26 from the battery 32 and by sending commands thereto through the I/O 44b. An external device (e.g., smartphone) 100 operable by the user can be made connectable to the ECU 44 as indicated by imaginary lines in FIG. 3.

Output shafts of the drive motors 26L and 26R are connected to rotating shafts of the left and right rear wheels 16, respectively, so as each to independently drive or rotate the left or right rear wheel 16. The drive motors 26L and 26R are configured such that they each independently rotates one of the rear wheels 16 normally (drive the vehicle 10 to run straight forward) or reversely (drive the vehicle 10 to run reverse). By establishing a difference between the rotating speeds of the left and right rear wheels 16, the vehicle 10 can be turned to an arbitrary direction.

For example, when the left and right rear wheels 16 are both rotated normally and the rotational speed of the right rear wheel 16 is greater than the rotational speed of the left rear wheel 16, the vehicle 10 turns left at a turning angle θ in accordance with the speed difference. Conversely, when the rotational speed of the left rear wheel 16 is greater than the rotational speed of the right rear wheel 16, the vehicle 10 turns right at a turning angle θ in accordance with the speed difference. When one of the left and right rear wheels 16 is rotated normally and the other reversely both at the same speed, the vehicle 10 turns on the spot (so-called "pivot-turn").

The vehicle 10 is configured to detect or recognize the working area AR based on the outputs of the aforesaid sensors, in particular the electromagnetic sensors 36, and perform the work in the working area AR.

The detection of the working area AR and the work thereat will be explained with reference to FIG. 4.

The working area 70 is delineated by laying (burying) a boundary wire (electrical wire) 72 around its periphery (boundary). A charging station 76 for charging the battery 32 of the vehicle 10 is installed above the boundary wire 72 at a location inside or outside, more precisely inside the working AR. The sizes of the vehicle 10 and charging station 76 in FIG. 4 are exaggerated.

Figure 5:
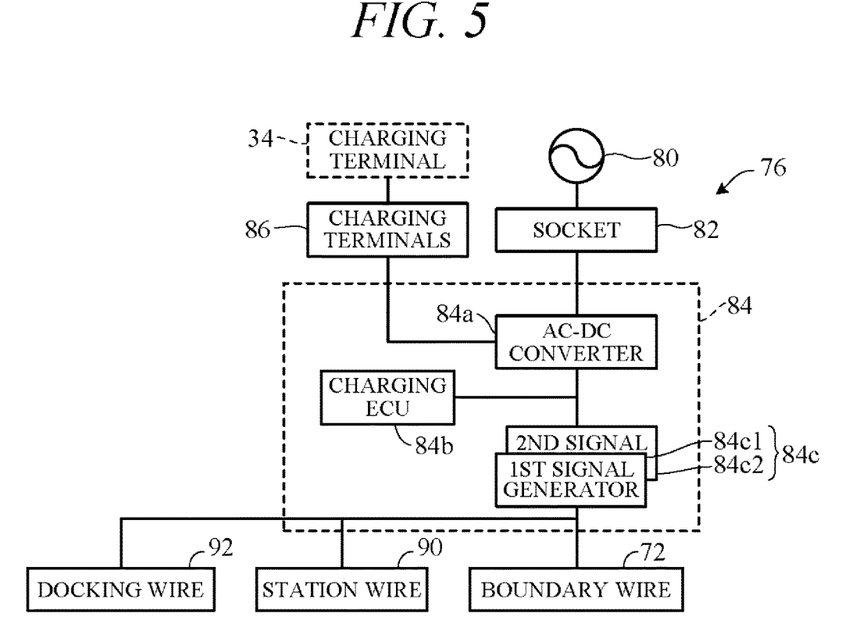
FIG. 5 is a block diagram showing configuration of a charging station of the utility vehicle shown in FIG. 4.

FIG. 5 is a block diagram showing electrical configuration of the charging station 76.

As shown in FIG. 5, the charging station 76 is equipped with a charger 84 connected through a socket 82 to a commercial power supply 80, and a pair of charging terminals 86 connected to the charger 84 and connectable to contact contacts 34a (shown in FIG. 2) of the pair of charging terminals 34 of the vehicle 10.

The charger 84 is equipped with an AC-DC converter 84a, a charging ECU (Electronic Control Unit) 84b also comprising a microcomputer and used to control operation of the AC-DC converter 84a, and two signal generators 84c (first signal generator 84c1 and second signal generator 84c2).

The charging station 76 is configured so that alternating current passing from the commercial power supply 80 through the socket 82 is converted to direct current and is stepped down to a suitable voltage by the AC-DC converter 84a of the charger 84 and sent to the charging terminals 86 to charge the onboard battery 32 through the charging contacts 32 and 86 when the vehicle 10 is returned and connected to the charging station 76. The AC-DC converter 84a steps down the current to a suitable voltage in response to commands determined by the ECU 44 and sent from the charging ECU 84b.

At the same time, the output of the AC-DC converter 84 is supplied to the charging ECU 84b and signal generators 84c (comprising a first signal generator 84c1 and a second signal generator 84c2). The charging ECU 84b is configured to be capable of communicating with the ECU 44 and controls operation of the first signal generators 84c1 and the second signal generator 84c2 by sending binary data pulses.

In response thereto, the first and second signal generators 84c1, 84c2 convert the direct current stepped down by the AC-DC converter 84a into area signal in continuance sequence of pulse train and supply the generated area signal to the boundary wire 72, a station wire 90 for delineating the charging station 76a and a docking wire 92 for guiding the vehicle 10 to a charging position.

Figure 6:
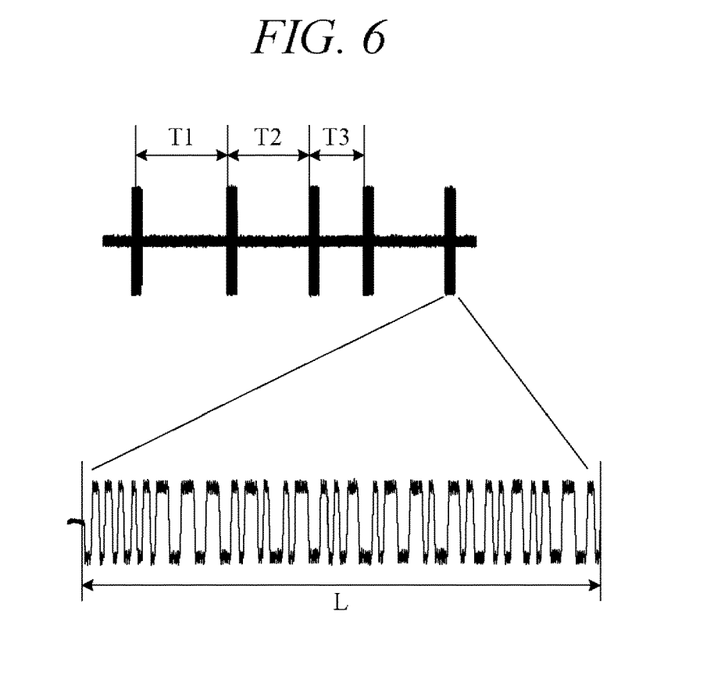
FIG. 6 is an explanatory diagram showing data signal of pulse train generated by a signal generator illustrated in FIG. 5.

FIG. 6 shows the area signal of pulse train generated by the first signal generator 84c1 to be passed through the boundary wire 72 that is corresponding to the binary data pulses sent from the charging ECU 84b. As shown, the area signal has a signal length L and is supplied to the boundary wire at random periods Tn. Although not shown, the second signal generator 84c2 generates similar data signal.

Figure 4:
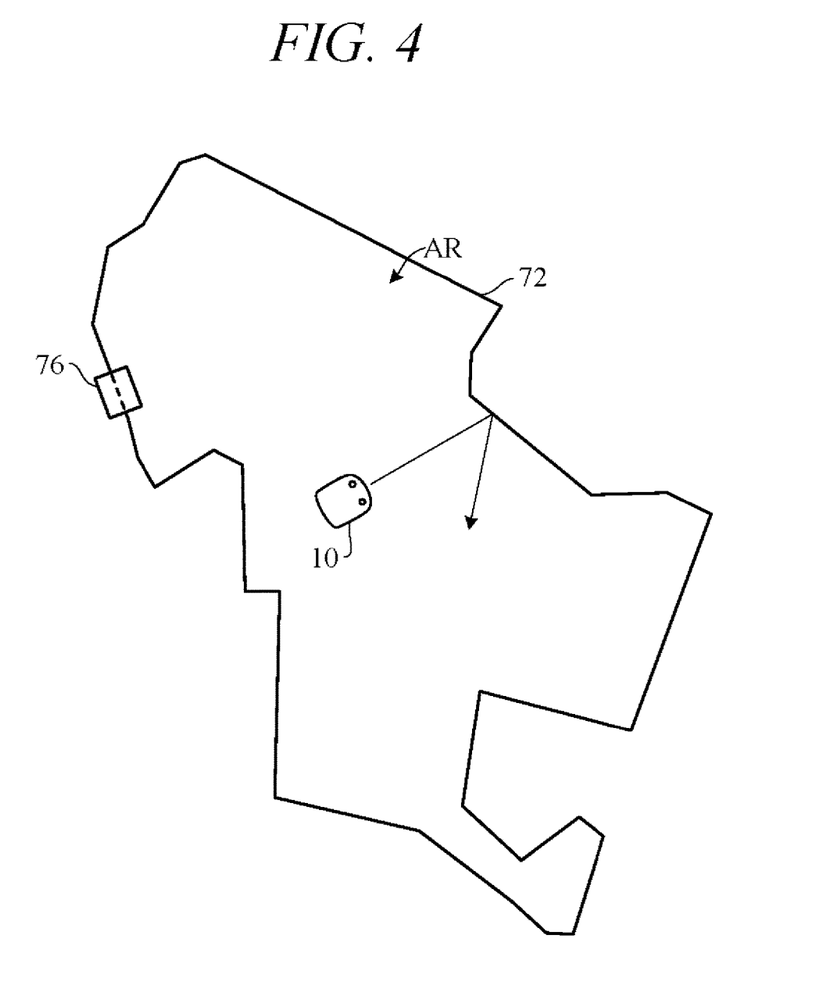
FIG. 4 is an explanatory diagram showing a working area (delimited by a boundary wire) of the utility vehicle illustrated in FIG. 1.

The detection of the working area AR shown in FIG. 4 will then be explained.

When electric current of the data signal shown in FIG. 6 is supplied to the boundary wire 72 by the first signal generator 84c1, a right-handed magnetic field is generated around the boundary wire 72 (Ampere's right-hand screw rule). The magnetic field intensity detected at this time differs depending on the total length of the boundary wire 72 and also differs with distance of the vehicle 10 from the boundary wire 72.

Figure 7:
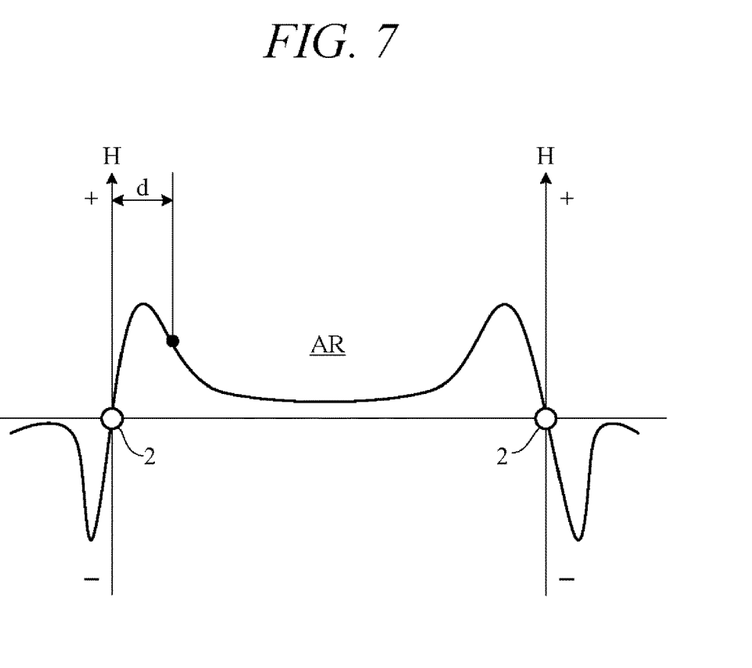
FIG. 7 is an explanatory diagram showing relationship between distance from the boundary wire and magnetic field strength generated by the data signal of FIG. 6.

FIG. 7 is a diagram showing relationship between distance d from the boundary wire 72 and magnetic field strength H. As indicated in FIG. 7, magnetic field strength H varies with distance d from the boundary wire 72. Specifically, magnetic field strength H is 0 above the boundary wire 2, positive inside the working area AR, and negative outside the same.

When work is in progress, the ECU 44 reads outputs of the magnetic sensors 36L, 36R and detects the position of the vehicle 10 in the working area AR. Specifically, the ECU 44 determines whether the vehicle 10 is inside or outside the working area AR and detects distance of the vehicle 10 from the boundary wire 72.

More specifically, the ECU 44 reads outputs of the magnetic sensors 36L, 36R and when the outputs are minus, drive the vehicle 10 to turn toward inside the working area AR at a random angle based on, for example, the output of the angular velocity sensor 46. As a result, work can be carried out inside the working area AR while the vehicle 10 is being driven to run straight forward at random direction, for example.

In the present embodiment, the vehicle 10 is controlled to operate in work mode and return mode in response to control commands sent from the ECU 44 in accordance with programs prepared beforehand and memorized in the memory 44c. In work mode, the vehicle 10 works (mows lawn or grass) while autonomously navigating in the working area AR. In return mode, the vehicle 10 is returned to the charging station 76 when the battery 32 requires charging. In work mode or return mode, the vehicle 10 is sometimes controlled to trace along the boundary wire 72. For example, this trace mode is executed before work mode to ascertain the working area AR as will be later explained.

Figure 8:
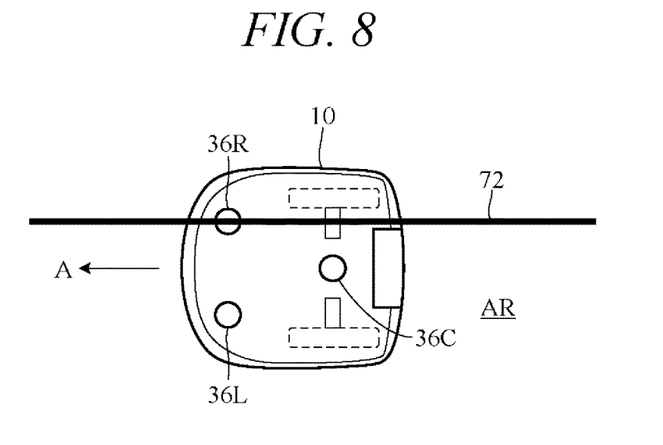
FIG. 8 is an explanatory diagram showing operation in trace mode of the vehicle illustrated in FIG. 1.

FIG. 8 is a diagram showing operation of the vehicle 1 in trace mode. As shown in FIG. 8, in trace mode the vehicle 1 is driven by commands from the ECU 44 to circuit along the boundary wire 72 with one of the pair of magnetic sensors 36R and 36L (e.g., 36L) positioned inside the boundary wire 72 and so that the other magnetic sensor (e.g., 36R) moves above the boundary wire 72 in the direction of arrow A. Specifically, the ECU 44 monitors output of the magnetic sensor 36R and controls operation of the drive motors 26L and 26R so that magnetic field strength H detected by the magnetic sensor 36R stays at 0.

For example, when magnetic field strength H detected from the output of the magnetic sensor 36R becomes positive, the vehicle 10 is turned rightward by decelerating right drive motor 26R and accelerating left drive motor 26L. On the other hand, when magnetic field strength H detected from the output of the magnetic sensor 36R becomes negative, the vehicle 10 is turned leftward by accelerating the right drive motor 26R and decelerating the left drive motor 26L. As a result, the right magnetic sensor 36R is brought near the boundary wire 72 and magnetic field strength H detected by the right magnetic sensor 36R is maintained at 0, so that the vehicle 10 can run on the boundary wire 72.

Trace mode is started from a state in which the terminals 34 of the vehicle 10 are connected to the terminals 86 of the charging station 76 and ends when the terminals 34 again connect to the terminals 86 after the vehicle 10 makes a circuit along the boundary wire 72. Position of the vehicle 10 from the start to the end of trace mode is successively detected from the output of the GPS receiver 54.

Based on the outputs of the GPS receiver 54 and the direction sensor 52, the ECU 44 generates a map of the working area AR (working area map MP) whose origin (starting point) is set at the charging station 76 based on the working area boundary line identified in trace mode.

Figure 9:
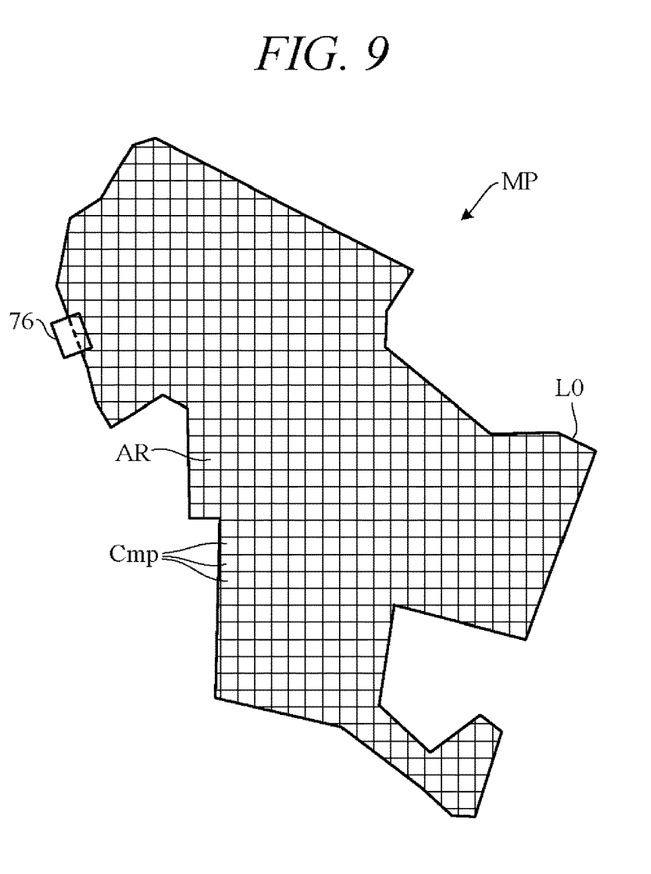
FIG. 9 is an explanatory diagram showing an example of a map of the working area illustrated in FIG. 4.

FIG. 9 is a diagram showing an example of the working area map MP. In the map MP, position of the boundary wire 72 is depicted as the boundary line (L0). More specifically, the map MP is configured by arraying the square cells Cmp in a grid pattern within a rectangular coordinate system plane including an X axis and a Y axis (XY plane) corresponding to inside of the working area AR. The plane is set with a reference orientation with respect to an origin corresponding to the position of the charging station 76. Each cell Cmp includes position data of X, Y coordinate. Size of the cells Cmp can be varied as appropriate and can, for example, be defined to coincide with working width of maximum outer diameter of blade 20.

The ECU 44 controls running of the vehicle 10 based on the illustrated running area map MP, but since the characterizing feature of this control apparatus for a utility vehicle is in the setting or calculation of the vehicle 10 work period, the explanation that follows is focused on this point.

Figure 10:
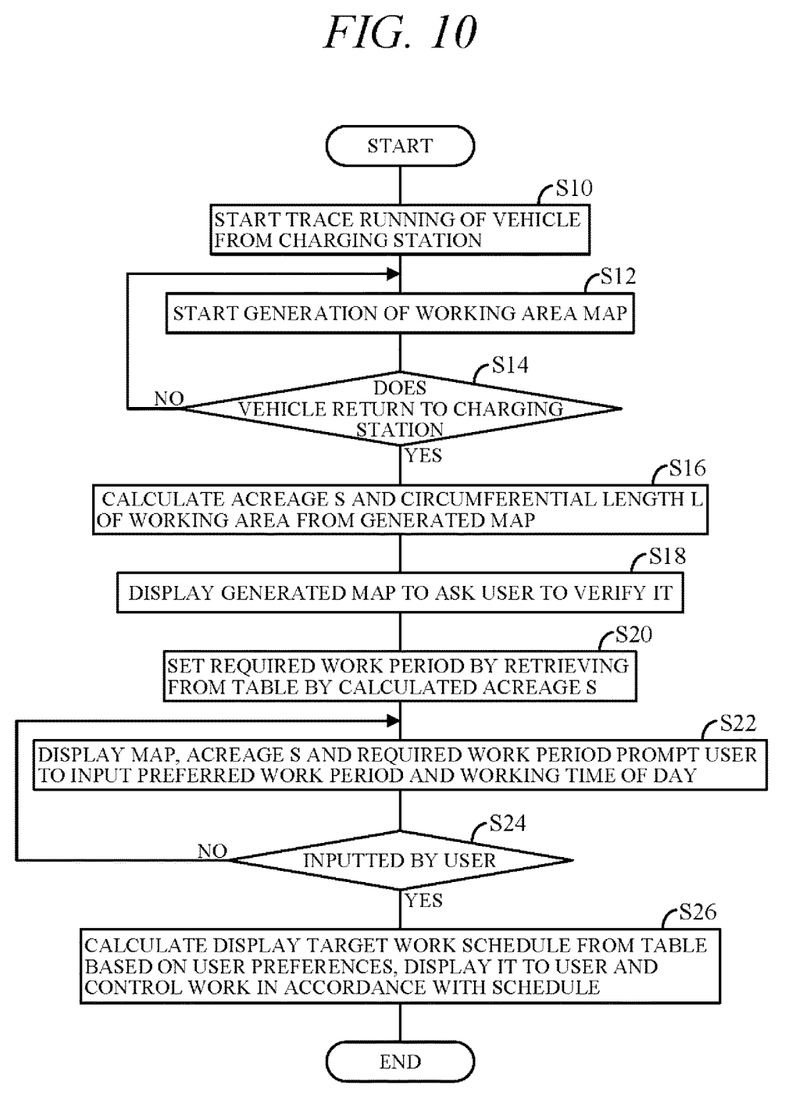
FIG. 10 is a flowchart showing operation of the control apparatus shown in FIG. 1.

FIG. 10 is a flowchart showing operations of the control apparatus for a utility vehicle. The illustrated program is executed by the ECU 44.

More specifically, as shown in FIG. 3, the ECU 44 has the CPU (microprocessor) 44a and the memory 44c, wherein the CPU (microprocessor) 44a is configured to function as map generating unit (or means) 44a1, an area calculating unit (or calculating means) 44a2, a required work period calculating unit (or calculating means) 44a3, a user input prompting unit (or prompting means) 44a4 and a work controlling unit (or control means) 44a5, and the unit 44a1 and other mentioned members perform the processing shown in FIG. 10.

Further, the user can be supplied with information through the external device 100 (as shown in FIG. 3) and can be prompted to provide input through the external device 100, or be enabled to input preferred settings through the external device 100.

Now to explain, in S10, trace-running of the vehicle 10 from the charging ST 76 is started or commenced, whereafter the program goes to S12, in which generation of the map MP is started or begun (S: processing Step).

Next, in S14, it is determined whether the vehicle 10 returned to the charging ST 76. This is done by determining from the output of the current sensor 62 whether the battery charging terminals 34 of the vehicle 10 contacted the charging terminals of the charging ST 76.

The processing of S14 is performed at predetermined time intervals, and every time the result in S14 is NO, the program returns to S12 to repeat the foregoing processing. The processing of S10 to S14 corresponds to processing for generating the map MP shown in FIG. 9 by the aforesaid trace-driving. The generated map MP is stored in a memory 44c.

Thus, the map generating unit generates the map MP by storing the position and the direction of the vehicle 10 detected by the position sensor 54 and direction sensor 52 in the memory 44c when making the vehicle 10 run starting from the charging station 72 and returning to the charging station 72.

Next, in S16, area (acreage or size) S and circumferential length (total length of L0) L of the working area AR are calculated based on the generated map MP. The area S is calculated by, for example, counting the number of cells Cmp of the map MP shown in FIG. 9. Alternatively, area (acreage) S can be calculated from polygon internal coordinates in accordance with Eq. 1. Circumferential length L is calculated from polygon internal coordinates in accordance with Eq. 2. In Eqs. 1 and 2, j: calculation time point (j=1: time point of departure from charging ST 76, j=n+1: time point of return to charging ST 76.

$$S = \frac{1}{2}\left|\sum_{j=1}^{n}(x_j - x_{j+1}) \times (y_j + y_{j+1})\right| \quad \text{Eq. 1}$$

$$L = \sum_{i=1}^{n}\sqrt{(x_j - x_{j+1})^2 + (y_j - y_{j+1})^2} \quad \text{Eq. 2}$$

The calculation of the area S in accordance with Eq. 1 is performed by successively determining the area of trapezoids obtained from running locus segments recurring upon every negative result in S14 and adding up sum of the determined area. The calculation of the circumferential length L in accordance with Eq. 2 is performed by determining and adding up the lengths of the individual running locus segments.

Next, in S18, the generated map MP is verified. Specifically, the generated map MP is displayed on the screen of the display 70 and the user is asked to verify it. This is done by the map generating unit 44a1.

Next, in S20, a required work period is set or selected by retrieval from the work period table using the calculated area S as search criterion. This processing is equivalent to calculating required work period per unit time period in accordance with characteristics (work period table shown in FIG. 11) set in advance with respect to the calculated area S of the working area AR.

Figure 11:
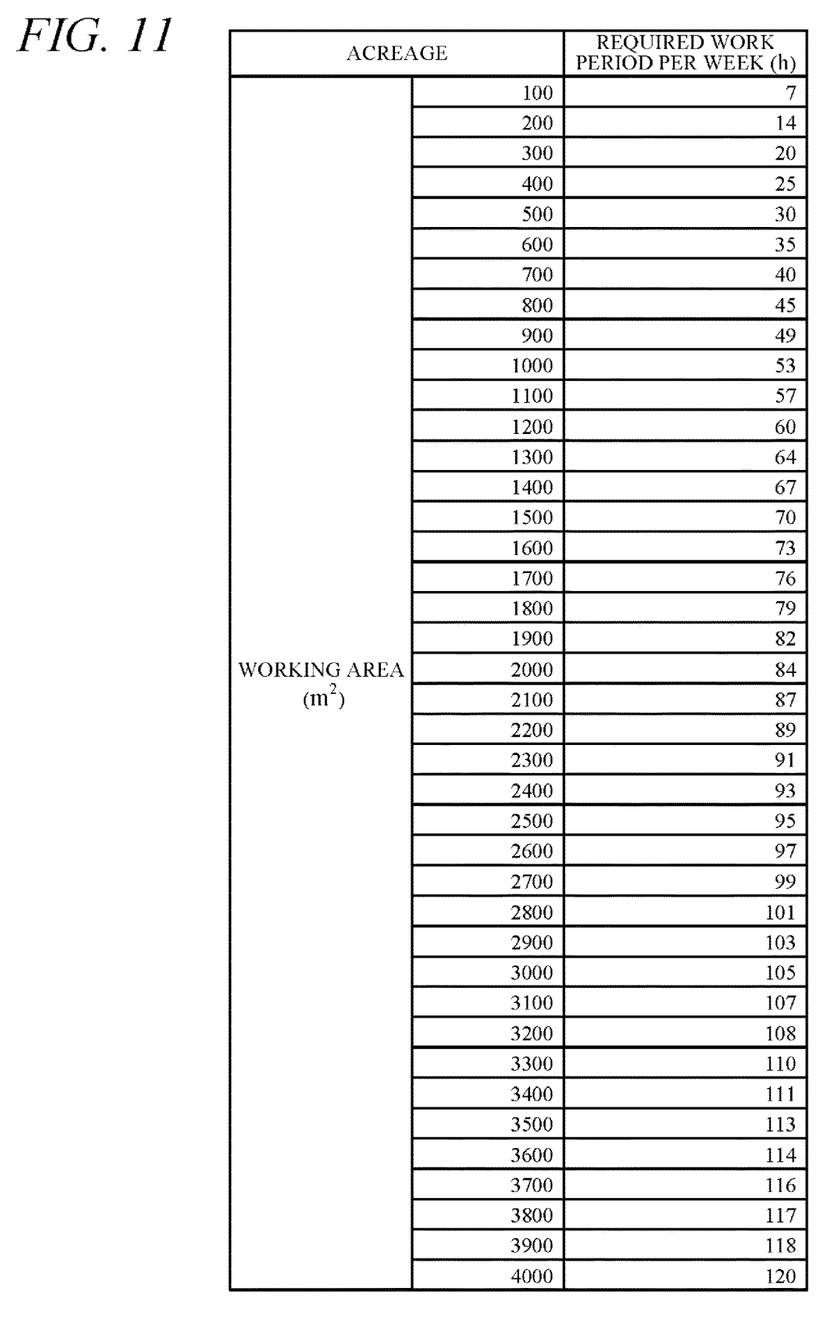
FIG. 11 is an explanatory diagram showing characteristics of work period table referred to in the operation of illustrated in FIG. 10.

The characteristics of the work period table are shown in FIG. 11. As illustrated, the work period table is compiled to include required work period per a unit time period (e.g., per week) not only for the working area AR shown in FIG. 9 but also for various other larger and smaller working areas according to area size.

Next, in S22, information including the map MP, the area S and the selected required work period is displayed to the user, and the user is prompted to input preferred work period and working time of day. In other words, information including at least the generated map MP of the working area AR, the calculated area S of the working area and the calculated required work period is presented to the user, and the user is prompted to input the user's preferred work period and preferred working time of day.

Taking into account that the user may have no preferred work period or time of day, the user is allowed as input to instruct that the work period and preferred working time of day be automatically set on the ECU 44 side.

Next in S24, it is determined whether input was effected by the user, and when the result is NO, the program returns to S22, and when YES, goes to S26, in which a target work schedule distributed within a unit period, e.g., one week, is calculated from the work distribution table based on user preferences inputted by the user through the input device 68, and work is controlled in accordance with the calculated target work schedule.

The processing of S26 is equivalent to processing by which the target work schedule is calculated, based on the preferred work period and preferred working time of day inputted by the user in response to prompting, by distributing the required work period within the unit time period in accordance with the second characteristics defined in advance, and controlling work in accordance with the calculated target work schedule.

By "controlling work" in the forgoing is meant switching to the work mode discussed earlier and performing lawn mowing work in accordance with the target work schedule by driving the blade 20 while running in the working area AR.

Figure 12:
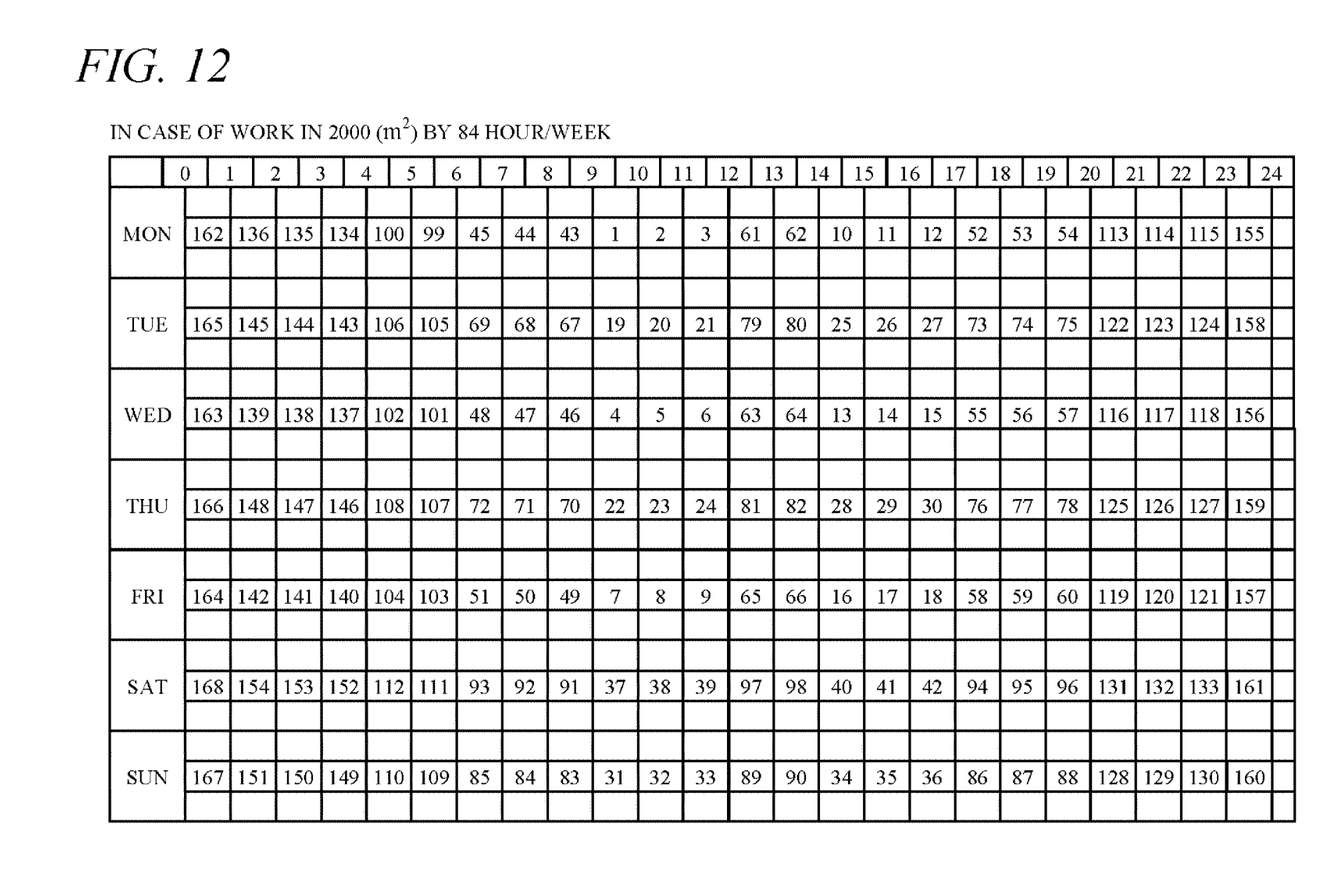
FIG. 12 is an explanatory diagram showing characteristics of work distribution table referred to in the operation of illustrated in FIG. 10.

The characteristics of a work distribution table are shown in FIG. 12. As can be seen, the work distribution table shows work area (in m²) between 12 a.m. and 12 p.m. during each day of one week from Monday to Sunday.

FIG. 12 shows processing when, in the specific case of the area S of the working area AR being 2,000 m² and the required work period being 84 hr/week, the user responded to prompting in S22 by inputting an instruction to automatically set the work on the side of the ECU 44. In this case, work is automatically performed in accordance with the target work schedule indicated in the drawing.

Figure 13:
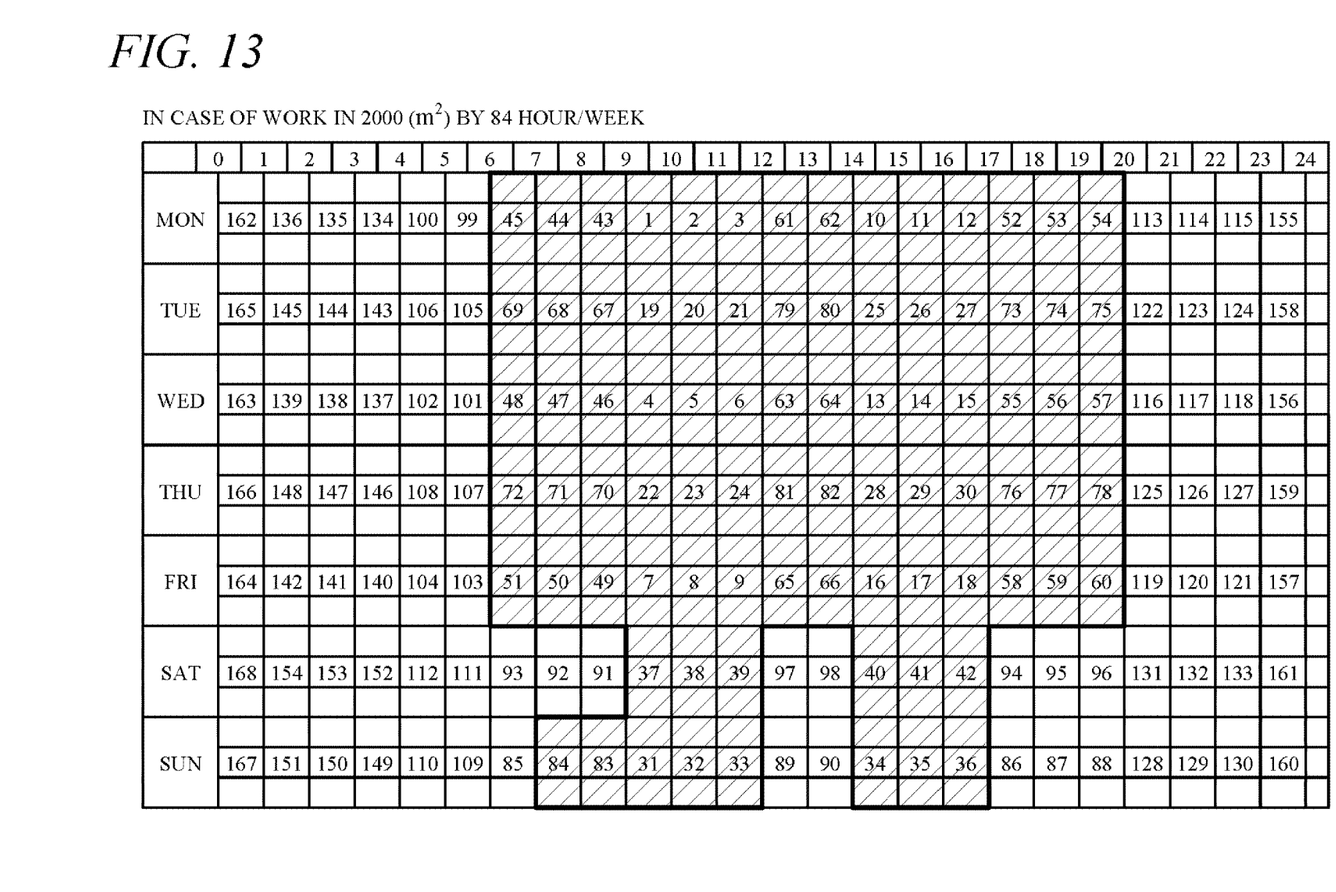
FIG. 13 is an explanatory diagram showing an example of the work distribution table illustrated in FIG. 12.

On the other hand, FIG. 13 shows an example in a similar work environment, in which the user, as indicated by hatching, preferred to set the work period and working time of day to from 6 a.m. to 8 p.m. on weekdays, from 9 a.m. to noon and 2 p.m. to 5 p.m. on Saturday, and from 7 a.m. to noon and 2 p.m. to 5 p.m. on Sunday. In this case, work is automatically performed in accordance with the user's preference.

Figure 14:
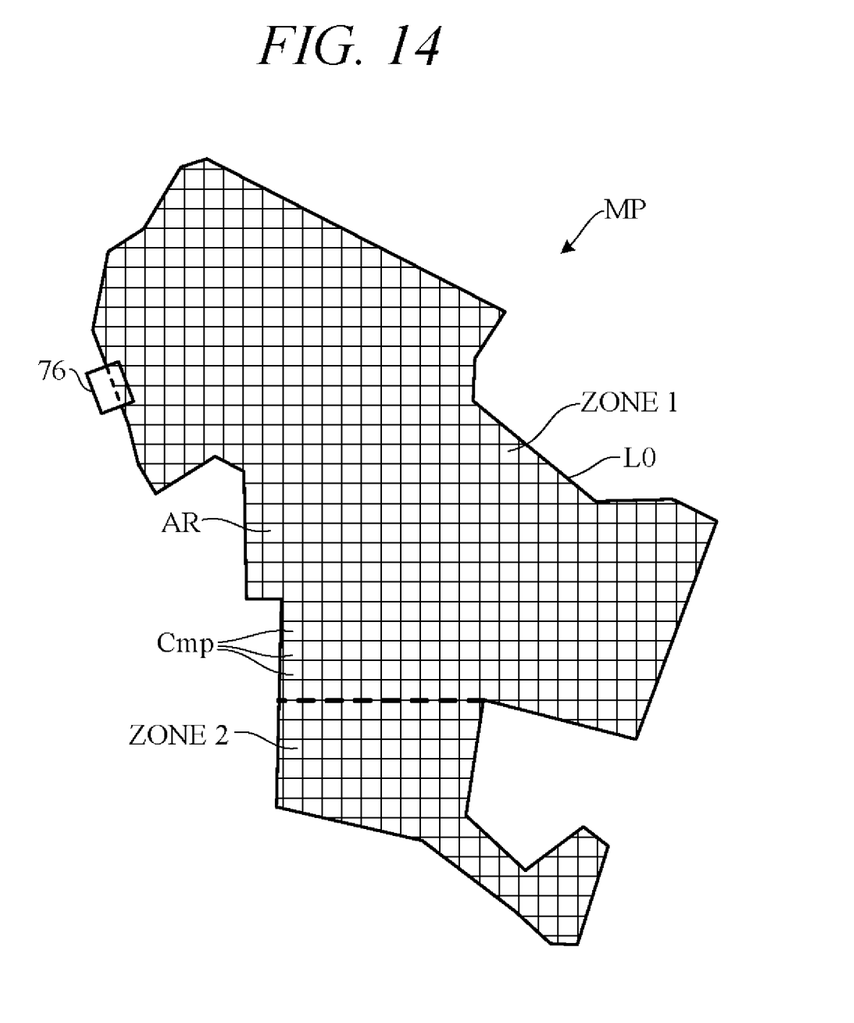
FIG. 14 is an explanatory diagram, similar to FIG. 4, but showing another example of the working area of the utility vehicle illustrated in FIG. 1.

As indicated by a dashed line in FIG. 14, the working area AR can be divided into multiple zones, such as zone 1 and zone 2, based on the generated map MP and the area S of working area AR be calculated in S16 of the flowchart of FIG. 10 separately for the individual divided zones. In such a case, the work period and working time of day are set separately for each zone in the processing from S18 onward in the flowchart FIG. 10.

As stated above, the present embodiment is configured to have an apparatus and method for controlling operation of a utility vehicle (10) that is driven by a prime mover (drive motor 26) to run within a working area (AR), comprising: an electronic control unit (ECU 44) having a CPU (44a) and a memory (44c), wherein the CPU is configured to function as a map generating unit (44a1, S10-S14) configured to generate a map (MP) by arraying multiple cells (CMP) in a grid pattern with respect to the working area; an area calculating unit (44a2, S16) configured to calculate area (S) of the working area based on the map generated by the map generating unit; a required work period calculating unit (44a3, S20) configured to calculate required work period per unit time period in accordance with first characteristics (more precisely first characteristics defined in advance) with respect to the area of the working area calculated by the area calculating unit; a user input prompting unit (44a4, S22) configured to show user information including at least the area of the working area calculated by the area calculating unit and the required work period calculated by the required work period calculating unit to prompt the user to input the user's preferred work period and preferred working time of day; and a work controlling unit (44a5, S24, S26) configured to calculate a target work schedule by distributing the required work period within the unit time period in accordance with second characteristics (more precisely second characteristics defined in advance) based on the user's preferred work period and preferred working time of day inputted by the user in response to prompting of user input prompting unit, and controlling work in accordance with the calculated target work schedule.

With this, by appropriately setting the first and second characteristics it becomes possible to perform work properly without the work period becoming too long or too short. Further, work period setting is also simplified from the user's viewpoint because it suffices to input preferred settings in response to prompting.

In the apparatus and method, the area calculating unit divides the working area into multiple zones (zone 1, zone 2) based on the generated map (MP) generated by the map generating unit and calculates the area of the working area separately for each of the divided zones.

With this, it becomes possible to perform work more properly without the work period becoming too long or too short.

The apparatus and method further include: a magnetic sensor (36) that detects a magnetic field generated during flow of electric current from an electric power supply (84c) through a boundary wire (72) laid at a boundary line (L0) of the working area (AR); and the map generating unit generates the map by making the vehicle run based on the magnetic field detected by the magnetic sensor.

With this, it becomes possible to calculate or set the target work schedule easily by doing at the time of generating the map MP necessary for running of the vehicle 10.

In the apparatus and method, the prime mover (drive motor 26) comprises an electric motor that is supplied with current from an onboard battery (32) that is charged by a charging station (72) installed in the working area (AR); and the map generating unit generates the map by making the vehicle (10) run starting from the charging station and returning to the charging station.

With this, it becomes possible to calculate or set the target work schedule easily by doing at the time of generating the map MP necessary for running of the vehicle 10.

The apparatus and method further include: a position sensor (54) that detects a position of the vehicle (10); and a direction sensor (52) that detects a direction of the vehicle (10); and the map (MP) generated by the map generating unit is a map by arraying multiple cells (CMP) in a grid pattern within a rectangular coordinate system including an X axis and a Y axis corresponding to the working area (AR); and the map generating unit generates the map (MP) by storing the position and the direction of the vehicle (10) detected by the position sensor (54) and the direction sensor (52) in a memory (44c) when making the vehicle (10) run starting from the charging station and returning to the charging station.

With this, it becomes possible to calculate or set the target work schedule easily by doing at the time of generating the map MP necessary for running of the vehicle 10.

The apparatus and method further include: an external device (100) operable by the user in such a manner that the user is supplied with information through the external device (100) and is prompted to input the user's preferred work period and preferred working time of day.

With this, in addition to the effects and advantages, it becomes possible for the user to calculate or set the target work schedule at a location remote from the vehicle 10.

In the apparatus and method, the map generating unit displays the generated map (MP) to ask the user to verify the map (S18).

With this, in addition to the effects and advantages, it becomes possible to generate the map more accurately.

In the above, it should be noted that values of the first and second characteristics as well as the unit time period are examples and should not be limited thereto.

It should further be noted that although the utility vehicle is applied for a lawn mowing or grass mowing, it may applied to any other type of works.

While the present invention has been described with reference to the preferred embodiments thereof, it will be understood, by those skilled in the art, that various changes and modifications may be made thereto without departing from the scope of the appended claims.

What is claimed is:

1. An apparatus for controlling operation of a utility vehicle that is driven by a prime mover to run within a working area, comprising:
an electronic control unit having a CPU and a memory, wherein the CPU is configured to function as:
a map generating unit configured to generate a map by arraying multiple cells in a grid pattern with respect to the working area;
an area calculating unit configured to calculate an area of the working area based on the map generated by the map generating unit;
a required work period calculating unit configured to calculate a required work period per unit time period in accordance with first characteristics with respect to the area of the working area calculated by the area calculating unit;
a user input prompting unit configured to show user information including at least the area of the working area calculated by the area calculating unit and the required work period calculated by the required work period calculating unit to prompt the user to input the user's preferred work period and preferred working time of day; and
a work controlling unit configured to calculate a target work schedule by distributing the required work period within the unit time period in accordance with second characteristics based on the user's preferred work period and preferred working time of day inputted by the user in response to prompting of user input prompting unit, and controlling work in accordance with the calculated target work schedule.

2. The apparatus according to claim 1, wherein the area calculating unit divides the working area into multiple zones based on the generated map generated by the map generating unit and calculates the area of the working area separately for each of the divided zones.

3. The apparatus according to claim 1, further including:
a magnetic sensor that detects a magnetic field generated during flow of electric current from an electric power supply through a boundary wire laid at a boundary line of the working area;
and the map generating unit generates the map by making the vehicle run based on the magnetic field detected by the magnetic sensor.

4. The apparatus according to claim 1, wherein the prime mover comprises an electric motor that is supplied with current from an on-board battery that is charged by a charging station installed in the working area;
and the map generating unit generates the map by making the vehicle run starting from the charging station and returning to the charging station.

5. The apparatus according to claim 4, further including:
a position sensor that detects a position of the vehicle; and
a direction sensor that detects a direction of the vehicle;
and the map generated by the map generating unit is a map by arraying multiple cells in a grid pattern within a rectangular coordinate system including an X axis and a Y axis corresponding to the working area;
and the map generating unit generates the map by storing the position and the direction of the vehicle detected by the position sensor and the direction sensor in the memory when making the vehicle run starting from the charging station and returning to the charging station.

6. The apparatus according to claim 1, further including:
an external device operable by the user in such a manner that the user is supplied with information through the external device and is prompted to input the user's preferred work period and preferred working time of day.

7. The apparatus according to claim 1, wherein the map generating unit displays the generated map to ask the user to verify the map.

8. A method for controlling operation of a utility vehicle that is driven by a prime mover to run within a working area, comprising the steps of:
generating a map by arraying multiple cells in a grid pattern with respect to the working area;
calculating an area of the working area based on the map generated by the step of map generating;
calculating a required work period per unit time period in accordance with first characteristics with respect to the area of the working area calculated by the step of area calculating;
showing user information including at least the area of the working area calculated by the step of area calculating and the required work period calculated by the step of required work period calculating to prompt the user to input the user's preferred work period and preferred working time of day; and
calculating a target work schedule by distributing the required work period within the unit time period in accordance with second characteristics based on the user's preferred work period and preferred working time of day inputted by the user in response to prompting of step of user input prompting, and controlling work in accordance with the calculated target work schedule.

9. The method according to claim 8, wherein the step of area calculating divides the working area into multiple zones based on the generated map generated by the step of map generating and calculates the area of the working area separately for each of the divided zones.

10. The method according to claim 8, further including the step of:
detecting a magnetic field generated during flow of electric current from an electric power supply through a boundary wire laid at a boundary line of the working area;
and the step of map generating generates the map by making the vehicle run based on the detected magnetic field.

11. The method according to claim 8, wherein the prime mover comprises an electric motor that is supplied with current from an on-board battery that is charged by a charging station installed in the working area;
and the step of map generating generates the map by making the vehicle run starting from the charging station and returning to the charging station.

12. The method according to claim 11, further including the steps of:
detecting a position of the vehicle; and
detecting a direction of the vehicle;
and the map generated by the step of map generating is a map by arraying multiple cells in a grid pattern within a rectangular coordinate system including an X axis and a Y axis corresponding to the working area;
and the step of map generating generates the map by storing the detected position and the detected direction of the vehicle in a memory when making the vehicle run starting from the charging station and returning to the charging station.

13. The method according to claim 8, further including:
an external device operable by the user in such a manner that the user is supplied with information through the external device and is prompted to input the user's preferred work period and preferred working time of day.

14. The method according to claim 8, wherein the step of map generating displays the generated map to ask the user to verify the map.

* * * * *